US011210585B1

United States Patent
Heess et al.

(10) Patent No.: US 11,210,585 B1
(45) Date of Patent: Dec. 28, 2021

(54) SELECTING REINFORCEMENT LEARNING ACTIONS USING A LOW-LEVEL CONTROLLER

(71) Applicant: DeepMind Technologies Limited, London (GB)

(72) Inventors: Nicolas Manfred Otto Heess, London (GB); Timothy Paul Lillicrap, London (GB); Gregory Duncan Wayne, London (GB); Yuval Tassa, London (GB)

(73) Assignee: DeepMind Technologies Limited, London (GB)

( * ) Notice: Subject to any disclaimer, the term of this patent is extended or adjusted under 35 U.S.C. 154(b) by 1266 days.

(21) Appl. No.: 15/594,228

(22) Filed: May 12, 2017

Related U.S. Application Data

(60) Provisional application No. 62/339,789, filed on May 20, 2016.

(51) Int. Cl.
*G06N 3/08* (2006.01)
*G06N 3/00* (2006.01)

(52) U.S. Cl.
CPC .............. *G06N 3/08* (2013.01); *G06N 3/006* (2013.01)

(58) Field of Classification Search
CPC ................................. G06N 3/08; G06N 3/006
See application file for complete search history.

(56) References Cited

U.S. PATENT DOCUMENTS

| 9,053,433 B2 * | 6/2015 | Will | G06K 9/00697 |
| 2015/0100530 A1 * | 4/2015 | Mnih | G06N 20/00 |
| | | | 706/25 |
| 2016/0012338 A1 * | 1/2016 | Ring | G06N 5/04 |
| | | | 706/14 |

(Continued)

OTHER PUBLICATIONS

Bram Bakker, "Reinforcement learning by backpropagation through an LSTM model/critic". Proceedings of the 2007 IEEE symposium on approximate dynamic programming and reinforcement learning (ADPRL 2007), pp. 127-134. (Year: 2007).*

(Continued)

*Primary Examiner* — Eric Nilsson
(74) *Attorney, Agent, or Firm* — Fish & Richardson P.C.

(57) ABSTRACT

Methods, systems, and apparatus for selecting actions to be performed by an agent interacting with an environment. One system includes a high-level controller neural network, low-level controller network, and subsystem. The high-level controller neural network receives an input observation and processes the input observation to generate a high-level output defining a control signal for the low-level controller. The low-level controller neural network receives a designated component of an input observation and processes the designated component and an input control signal to generate a low-level output that defines an action to be performed by the agent in response to the input observation. The subsystem receives a current observation characterizing a current state of the environment, determines whether criteria are satisfied for generating a new control signal, and based on the determination, provides appropriate inputs to the high-level and low-level controllers for selecting an action to be performed by the agent.

18 Claims, 3 Drawing Sheets

(56) References Cited

U.S. PATENT DOCUMENTS

2020/0049731 A1* 2/2020 Dahl .................. G01P 15/093

OTHER PUBLICATIONS

Andre et al. "State abstraction for programmable reinforcement learning agents," In AAAI/IAAI, Jul. 28, 2002, 7 pages.
Asadi et al. "Effective control knowledge transfer through learning skill and representation hierarchies," In IJCAI, vol. 7, Jan. 6, 2007, 6 pages.
Brooks et al. "A robust layered control system for a mobile robot," IEEE Journal of Robotics and Automation, 2(1) Mar. 1986, 28 pages.
Da Silva et al. "Learning parameterized motor skills on a humanoid robot," 2014 IEEE International Conference on Robotics and Automation, May 31, 2014, 6 pages.
Dayan et al. "Feudal reinforcement learning," In Advances in neural information processing systems, Morgan Kaugmann Publishers, 1993, 8 pages.
Dominici et al. "Locomotor primitives in newborn babies and their development," Science 334(6058) Nov. 18, 2011, 3 pages.
Gu et al. "Continuous deep q-learning with model-based acceleration," arXiv preprint arXiv 1603.00748, Jun. 11, 2016, 13 pages.
Heess et al. "Learning continuous control policies by stochastic value gradients," Advances in Neural Information Processing Systems, 2015, 9 pages.
Ijspeert et al. "Learning attractor landscapes for learning motor primitives," In Advances in Neural Information Processing Systems 15, 2003, 8 pages.
Kingma et al. "Auto-encoding variational Bayes," arXiv preirnt arXiv 1312.6114, Dec. 27, 2013, 14 pages.
Konidaris et al. "Efficient skill learning using abstraction selection," IJCAI, vol. 9, Jul. 11, 2009, 6 pages.
Levine et al. "End-to-end training of deep visumotor policies," arXiv preprint arXiv 1504.00702, Apr. 25, 2015, 12 pages.
Lillicrap et al. "Continuous control with deep reinforcement learning," arXiv preprint arXiv 1509.02971, Nov. 18, 2015, 14 pages.
Loeb et al. "A hierarchical foundation for models of sensorimotor control," Experimental brain research, 126(1) Apr. 12, 1999, 18 pages.
Mnih et al. "Asynchronous methods for deep reinforcement learning," CoRR, abs1602.01783, Jun. 11, 2016, 10 pages.
Mussa-Ivaldi et al. "Motor learning through the combination of primitives," Philosophical Transactions of the Royal Society of London B: Biological Sciences, 355(1404) Dec. 29, 2000, 15 pages.
Ravindran et al. "Relativized options: Choosing the right transformations," In ICML, 2003, 8 pages.
Rezende et al. "Stochastic Backpropagation and Approximate inference in Deep Generative Models," International Conference on Machine Learning, May 3, 2014, 14 pages.
Schulman et al. "High-dimensional continuous control using generalized advantage estimation," arXiv preprint arXiv 1506.02438, Jun. 8, 2015, 9 pages.
Song et al. "A neural circuitry that emphasizes spinal feedback generates diverse behaviours of human locomotion," The Journal oh Physiology, 593(16) Aug. 2015, 19 pages.
Sutton et al. "Between mdps and semi-mdps: A framework for temporal abstraction in reinforcement learning," Artificial intelligence, 112(1), Aug. 1, 1999, 31 pages.
Thomas et al. "Motor primitive discovery," 2012 IEEE International Conference on Development and Learning and Epigenetic Robotics, Nov. 7, 2012, 8 pages.
Todorov et al. "From task parameters to motor syndergies: A hierarchical framework for approximately optimal control of redundant manipulators," Journal of robotic systems, 22(11) Nov. 2005, 29 pages.
Vezhnevets et al. "Strategic attentive writer for learning macro-actions," CoRR, abs/1606.04695, 2016, 9 pages.
Wayne et al. "Hierarchical control using networks trained with high-level forward models," Neural computation, Sep. 3, 2014, 32 pages.

* cited by examiner

SELECTING REINFORCEMENT LEARNING ACTIONS USING A LOW-LEVEL CONTROLLER

CROSS REFERENCE TO RELATED APPLICATIONS

This application is a non-provisional of and claims priority to U.S. Provisional Patent Application No. 62/339,789, filed on May 20, 2016, the entire contents of which are hereby incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a reinforcement learning system implemented as computer programs on one or more computers in one or more locations can select an action to be performed by an agent interacting with an environment using a high-level controller neural network and a low-level controller neural network.

The subject matter described in this specification can be implemented in particular embodiments so as to realize one or more of the following advantages. The reinforcement learning system can effectively select actions to be performed by an agent in high-dimensional action spaces in order to complete a task, i.e., by using a hierarchical control structure. The hierarchical control structure includes a high-level controller and low-level controller that differ both in their access to information contained in observations and the time scales at which they operate. This hierarchical control structure enables the low-level controller to focus on reactive control (e.g., swimming or walking) while the high-level controller directs behavior towards a task goal (e.g., reaching a specified target) by modulating these low-level controller behaviors. In addition, by using this hierarchy control structure, the reinforcement learning system may avoid re-training an agent from scratch every time a new task is encountered because the low-level controller can be re-used across a variety of related tasks. For example, the low-level controller can be trained to control the movement of the joints of an agent while performing one task. The same low-level controller can then be used for a different task, e.g., reaching a different goal or accomplishing a different robotic objective. As the low-level controller can be reused across different tasks without training, the reinforcement learning system only needs to train the high-level controller for each task. Therefore, the reinforcement learning system can select actions to be performed by the agent in a resource-efficient manner.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order to interact with the environment, the agent receives data characterizing the current state of the environment and performs an action from an action space, i.e., a discrete action space or a continuous action space, in response to the received data. Data characterizing a state of the environment will be referred to in this specification as an observation.

In some implementations, the environment is a simulated environment and the agent is implemented as one or more computers interacting with the simulated environment. For example, the simulated environment may be a video game and the agent may be a simulated user playing the video game.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these cases, the observation can be data captured by one or more sensors of the mechanical agent as it interacts with the environment, e.g., a camera, a lidar sensor, a temperature sensor, and so on.

Figure 1:
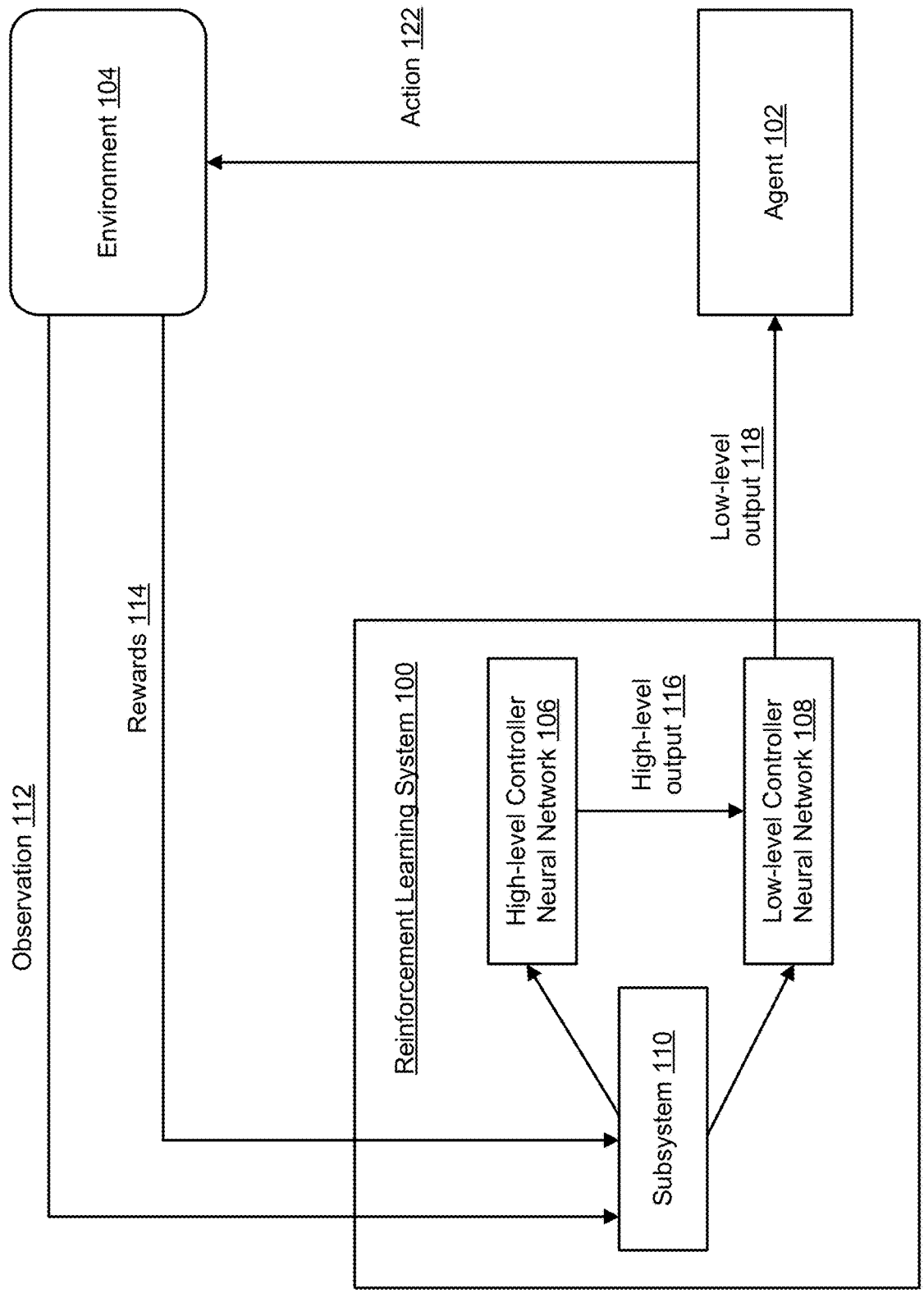
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from an action space to be performed by the reinforcement learning agent 102 in response to the observation.

In particular, the reinforcement learning system 100 includes a high-level controller neural network 106, a low-level controller neural network 108, and a subsystem 110 that interacts with the high-level controller 106 and the low-level control 108 to select an action.

The subsystem 110 is configured to receive an input observation (e.g., the input observation 112) characterizing a state of the environment 104. The input observation may be received from one or more sensors (e.g., a camera, a lidar sensor, and a temperature sensor) that interact with the environment 104. The one or more sensors can be embedded in the reinforcement learning agent 102. After receiving an input observation 112, the subsystem 110 interacts with the high-level controller 106 and low-level controller 108 to provide the input observation 112 to the controllers for selecting an action. The process for selecting an action is described in more detail below with reference to FIG. 3.

The high-level controller neural network 106 is a recurrent neural network, e.g., a long short-term memory (LSTM) neural network or a gated recurrent unit (GRU) neural network, that is configured to receive an input observation 112 from the subsystem 110. The high-level controller 106 then processes the input observation 112 to generate a high-level output 116 that defines a control signal for the low-level controller neural network 108.

The low-level controller neural network 108 is a non-recurrent neural network, e.g., a deep feedforward neural network, that is configured to receive a designated component of an input observation 112 from the subsystem 110. The low-level controller 108 then processes the designated component of the input observation and an input control signal received from the high-level controller 106 to generate a low-level output 118 that defines an action 122 to be performed by the agent 102 in response to the input observation. The designated component may include a component characterizing task-independent, proprioceptive information that was measured at a close range to the body of the reinforcement learning agent 102 when the agent 102 is interacting with the environment. For example, the task-independent, proprioceptive information includes joint angles of the body of the agent, angular velocities of the agent, velocities of different segments that form the agent, and haptic information.

After the reinforcement learning agent has performed the action 122, the subsystem 110 may receive a next observation characterizing the next state of the environment 104, i.e., the state that the environment 104 transitioned into as a result of the agent 102 performing the selected action 122.

In some implementations, to allow the high-level controller 106 and the low-level controller 108 to effectively be used to select actions to be performed by the agent, the system trains the high-level controller 106 and the low-level controller 108 to adjust the values of the parameters of the high-level controller 106 and the low-level controller 108. During the training, the system 100 receives rewards 114 (e.g., numeric values) as results of the agent 102 performing selected actions. The system 100 uses the received rewards to adjust the values of the parameters of the high-level controller 106 and low-level controller 108.

In some other implementation, the system can receive rewards during execution of the system. Rewards received during execution can be used as reference data for future training.

Figure 2:
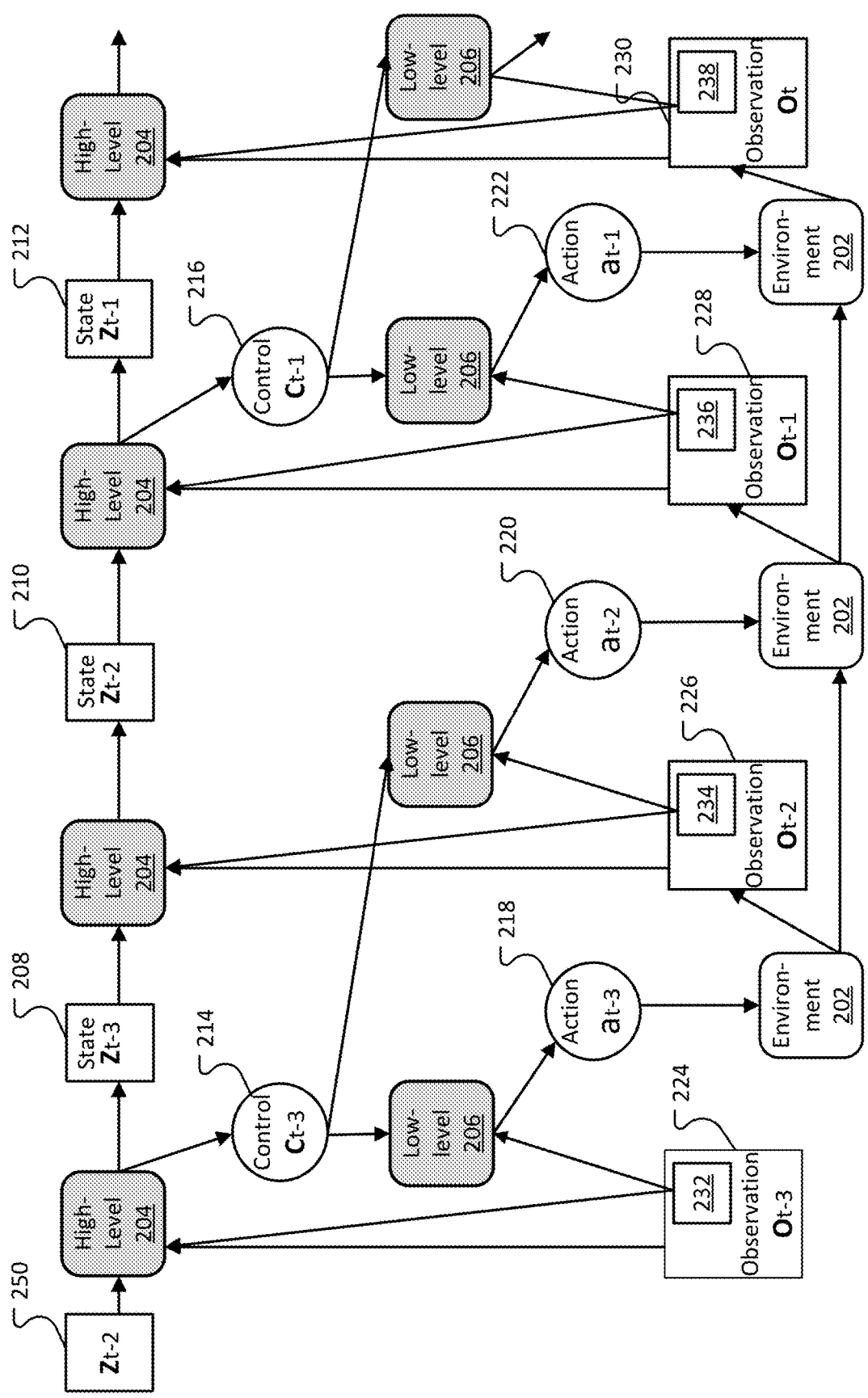
FIG. 2 is a flow diagram of an example structure of a control hierarchy including a high-level controller and a low-level controller.

FIG. 2 is a flow diagram of an example structure of a control hierarchy including a high-level controller 204 and a low-level controller 206. At a given time step, the high-level controller 204 receives an observation (e.g., receiving observation $O_{t-3}$ (224) at time step t-3) of an environment 202. An observation may include proprioceptive and exteroceptive information. Proprioceptive information includes information measured at close range to the body of an agent, for example, joint angles and velocities of the body and haptic information. Exteroceptive information includes information characterizing the environment at a distance from the agent (e.g., task-specific information such as a goal for the agent to reach) or characterizing a position or an orientation of the agent relative to the environment. Exteroceptive information can be obtained from exteroceptive sensors such as vision, auditory and olfactory sensors. The high-level controller 204 has access to all proprioceptive and exteroceptive information of the current observation, while the low-level controller 206 has access only to a designated component of the current observation, e.g., a task-independent, proprioceptive information component. As shown in FIG. 2, the high-level controller 204 receives all information included in the observation 224, while the low-level controller 206 receives only a designated component 232 of the current observation 224. Once the high-level controller 204 receives a new observation, the high-level controller 204 updates its current state to a new state.

The high-level controller 204 includes one or more neural networks (e.g., one or more recurrent networks) that integrate observations at every time step and produce a high-level output that defines a new control signal every K time steps (i.e., control interval). Generally, K is an integer greater than one, so that new control signals are not defined each time step. For example, as shown in FIG. 2, the high-level controller 204 is a recurrent network that processes an observation (e.g., observation 224) in accordance with a current recurrent state (e.g., state $Z_{t-2}$ (250)), and generates a high-level output that defines a control signal (e.g., control signal $C_{t-3}$) every two time steps (i.e., K=2). In some implementations, the high-level output parameterizes an action distribution over possible control signals. For example, given a history of observations and actions $h_t=(o_1, a_1, \ldots o_{t-1}, a_{t-1}, o_t)$, the high-level output parameterizes an action distribution as a factorized normal distribution with mean and variance being functions of $h_t$: $a_t \sim \pi(\bullet|h_t) = \mathcal{N}(\bullet|\mu(h_t), \sigma^2(h_t))$. The high-level controller samples a new control signal from the action distribution in accordance with the high-level output by processing the current observation. In some other implementations, the high-level output includes a new control signal. The new control signal will be sent to the low-level controller 206 to modulate behavior of the low-level controller 206.

The low-level controller 206 includes a neural network (e.g., a non-recurrent neural network) that processes the designated component of the current observation and the control signal received from the high-level controller to generate a low-level output that defines an action to be performed by the agent in response to the current observation. For example, the low-level controller 206 processes the designated component 232 and the control signal $C_{t-3}$ (214) to generate a low-level output that defines an action $a_{t-3}$ (218). In some implementations, the low-level output parameterizes an action distribution over possible actions, and the low-level controller 206 samples an action from the action distribution in accordance with the low-level output by processing the designated component of the current observation. For example, the action distribution can be a diagonally-factorized normal distribution. In some other implementations, the low-level output identifies an action from a space of possible actions. The actions can be multi-dimensional actions. For example, each of the actions can include N control signals for N joint motors of the agent.

When N is greater than 1, the action space is a multi-dimensional action space that includes multi-dimensional actions.

After the low-level controller generates a low-level output that defines an action, the agent executes the action (e.g. action 218) while interacting with the environment to attempt to accomplish a specific task. After the agent performs the action, the high-level controller receives a new observation (e.g., new observation $O_{t-2}$ (226)) and updates its current recurrent state to a new recurrent state (e.g., new state $Z_{t-3}$ (208)). The low-level controller receives a designated component of the new observation (e.g., designated component 234). At time steps that are not multiples of K, the low-level controller generates an output from the designated component of the new observation and the most recent control signal that was previously generated by the high-level controller. At time steps that are multiples of K, the low-level controller receives a new control signal from the high-level controller. The low-level controller then generates an output from the designated component of the new observation and the new control signal.

In some implementations, the agent receives a reward as a result of the agent performing the action. In such implementations, the agent's goal is to maximize the expected sum of discounted future rewards (also referred to as return).

In some implementations, the low-level controller has been pre-trained while the agent was interacting with the environment while attempting to accomplish a different task. For example, the low-level controller has been pre-trained to perform one task or a set of different tasks using a reinforcement learning technique, e.g., an actor-critic policy gradient ascent method to maximize the expected sum of discounted future rewards. As the low-level controller can be pre-trained to perform a set of tasks, the same low-level controller can be shared by multiple high-level controllers in which each of the high-level controllers performs a different task in the set of tasks.

Figure 3:
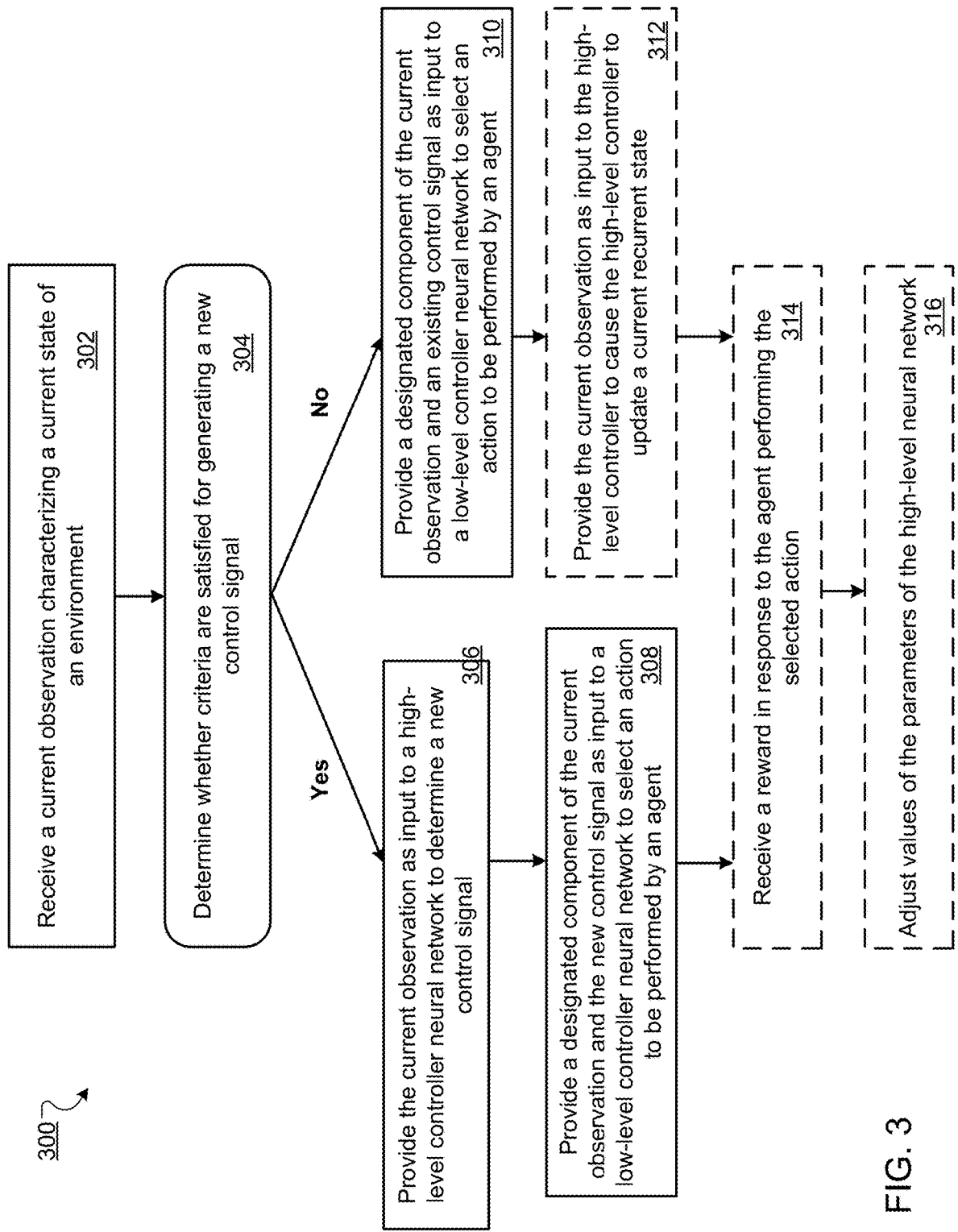
FIG. 3 is a flow diagram of an example process for selecting an action to be performed by an agent.

FIG. 3 is a flow diagram of an example process for selecting an action to be performed by an agent in response to an observation. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system receives a current observation characterizing a current state of the environment (step 302).

The system determines whether criteria are satisfied for generating a new control signal for the low-level controller (step 304). Generally, determining whether criteria are satisfied for generating a new control signal includes determining whether more than a threshold number of observations have been received since the existing control signal was generated. The threshold number of observations may be greater than one.

When the criteria are satisfied, the system provides the current observation as input to the high-level controller to determine a new control signal (step 306). The high-level controller can be a recurrent neural network configured to process the input observation in accordance with a recurrent state to generate the high-level output defining the control signal and to update the recurrent state.

The system then provides a designated component of the current observation and the new control signal as input to the low-level controller neural network to select an action to be performed by the agent in response to the current observation (step 308). The designated component of the current observation includes a component characterizing a task-independent, proprioceptive component of the current state of the environment.

When the criteria are not satisfied, the system provides the designated component of the current observation and an existing control signal defined by a high-level output previously generated by the high-level controller, e.g., the most recent high-level output generated by the high-level controller, as input to the low-level controller neural network to select an action to be performed by the agent in response to the current observation (step 310). The system may provide the current observation as input to the high-level controller to cause the high-level controller to update a current recurrent state (step 312).

In some implementations, the system automatically determines to generate a new control signal for each time step rather than determining whether the criteria are satisfied at any given time step.

In some implementations, to allow the high-level controller and the low-level controller to effectively be used to select actions to be performed by the agent, the system trains the high-level and low-level controllers to adjust the values of the parameters of the high-level controller and the low-level controller. During the training, the system receives a reward as a result of the agent performing the selected action (step 314). In some cases, the system adjusts values of the parameters of the high-level controller neural network while holding values of the parameters of the low-level controller neural network fixed based on the received reward using a reinforcement learning technique, for example, stochastic gradient ascent method or its variants (step 316). In some other cases, the system can adjust values of the parameters of the high-level controller neural network and low-level controller neural network at the same time based on the received reward using the reinforcement learning technique.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for selecting actions to be performed by an agent interacting with an environment, the system comprising:
   a high-level controller neural network, wherein the high-level controller neural network is configured to:
      receive an input observation characterizing a state of the environment, wherein the input observation includes (i) proprioceptive information associated with the agent, and (ii) exteroceptive information characterizing the environment at a distance from the agent, and
      process the input observation to generate a high-level output defining a control signal for a low-level controller neural network;
   the low-level controller neural network, wherein the low-level controller neural network is configured to:
      receive only the proprioceptive information of the input observation, and
      process (i) the proprioceptive information of the input observation and (ii) an input control signal generated by the high-level controller neural network to generate a low-level output that defines an action to be performed by the agent in response to the input observation; and
   a subsystem, wherein the subsystem is configured to:
      receive a current observation characterizing a current state of the environment;
      determine whether criteria are satisfied for generating a new control signal;
      when the criteria are satisfied:
         provide the current observation as input to the high-level controller neural network to determine a new control signal, and
         provide only the proprioceptive information of the current observation and the new control signal as input to the low-level controller neural network to select an action to be performed by the agent in response to the current observation; and
      when the criteria are not satisfied:
         provide the proprioceptive information of the current observation and an existing control signal defined by a high-level output previously generated by the high-level controller neural network as input to the low-level controller neural network to select an action to be performed by the agent in response to the current observation.

2. The system of claim 1, wherein determining whether criteria are satisfied for generating a new control signal comprises determining whether more than a threshold number of observations have been received since the existing control signal was generated.

3. The system of claim 2, wherein the threshold number is greater than one.

4. The system of claim 1, wherein the high-level controller neural network is a recurrent neural network configured to process the input observation in accordance with a recurrent state to generate the high-level output defining the control signal and to update the recurrent state.

5. The system of claim 4, wherein the subsystem is further configured to, when the criteria are not satisfied, provide the current observation as input to the high-level controller neural network to cause the high-level controller neural network to update a current recurrent state.

6. The system of claim 1, wherein the low-level output parameterizes a distribution over possible actions, and wherein selecting an action comprises sampling from the distribution in accordance with the low-level output generated by the low-level controller neural network by processing the proprioceptive information of the current observation.

7. The system of claim 1, wherein the low-level output identifies an action from a space of possible actions.

8. The system of claim 1, wherein the high-level output parameterizes a distribution over possible control signals, and wherein determining a new control signal comprises sampling from the distribution in accordance with the high-level output generated by the high-level controller neural network by processing the current observation.

9. The system of claim 1, wherein the high-level output is the control signal.

10. The system of claim 1, wherein the agent is interacting with the environment while attempting to accomplish a first task, and wherein the low-level controller neural network has been pre-trained while the agent was interacting with the environment while attempting to accomplish a different task.

11. The system of claim 10, wherein the subsystem is further configured to:
    receive a reward in response to the agent performing the selected action; and
    adjust values of the parameters of the high-level controller neural network while holding the values of the parameters of the low-level controller neural network fixed based on the received reward using a reinforcement learning technique.

12. A computer-implemented method for selecting actions to be performed by an agent interacting with an environment, the method comprising:
    receiving a current observation characterizing a current state of the environment, wherein the current observation includes (i) proprioceptive information associated with the agent, and (ii) exteroceptive information characterizing the environment at a distance from the agent;

determining whether criteria are satisfied for generating a new control signal;

when the criteria are satisfied:
providing the current observation including the proprioceptive information and the exteroceptive information as input to a high-level controller neural network to determine a new control signal, and
providing only the proprioceptive information of the current observation and the new control signal as input to a low-level controller neural network to select an action to be performed by the agent in response to the current observation; and when the criteria are not satisfied:
providing only the proprioceptive information of the current observation and an existing control signal defined by a high-level output previously generated by the high-level controller neural network as input to the low-level controller neural network to select an action to be performed by the agent in response to the current observation.

13. The computer-implemented method of claim 12, wherein determining whether criteria are satisfied for generating a new control signal comprises determining whether more than a threshold number of observations have been received since the existing control signal was generated.

14. The computer-implemented method of claim 13, wherein the threshold number is greater than one.

15. The computer-implemented method of claim 12, wherein the high-level controller neural network is a recurrent neural network configured to process the input observation in accordance with a recurrent state to generate the high-level output defining the control signal and to update the recurrent state.

16. The computer-implemented method of claim 12, further comprising:
when the criteria are not satisfied, providing the current observation as input to the high-level controller to cause the high-level controller neural network to update a current recurrent state.

17. The computer-implemented method of claim 12, further comprising:
receiving a reward in response to the agent performing the selected action; and
adjusting values of the parameters of the high-level controller neural network while holding the values of the parameters of the low-level controller neural network fixed based on the received reward using a reinforcement learning technique.

18. One or more non-transitory computer storage media encoded with instructions that, when executed by one or more computers, cause the one or more computers to implement a system for selecting actions to be performed by an agent interacting with an environment, the system comprising (i) a high-level controller neural network configured to: receive an input observation characterizing a state of the environment, and process the input observation to generate a high-level output defining a control signal for a low-level controller neural network, and (ii) a low-level controller neural network configured to: receive only proprioceptive information of an input observation, and process only the proprioceptive information of the input observation and an input control signal to generate a low-level output that defines an action to be performed by the agent in response to the input observation, the instructions comprising:
receiving a current observation characterizing a current state of the environment, wherein the current observation includes (i) proprioceptive information associated with the agent, and (ii) exteroceptive information characterizing the environment at a distance from the agent;
determining whether criteria are satisfied for generating a new control signal;
when the criteria are satisfied:
providing the current observation including the proprioceptive information and the exteroceptive information as input to a high-level controller neural network to determine a new control signal, and
providing only the proprioceptive information of the current observation and the new control signal as input to a low-level controller neural network to select an action to be performed by the agent in response to the current observation; and
when the criteria are not satisfied:
providing only the proprioceptive information of the current observation and an existing control signal defined by a high-level output previously generated by the high-level controller neural network as input to the low-level controller neural network to select an action to be performed by the agent in response to the current observation.

\* \* \* \* \*